US009167578B2

(12) United States Patent
Robson et al.

(10) Patent No.: US 9,167,578 B2
(45) Date of Patent: Oct. 20, 2015

(54) RADIO RESOURCE ALLOCATION FOR CELLULAR WIRELESS NETWORKS

(71) Applicant: Microsoft Corporation, Redmond, WA (US)

(72) Inventors: Julius Robson, Paris (FR); David Bevan, Bishops Stortford (GB); Mathieu Boue-Lahorgue, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/521,399

(22) Filed: Oct. 22, 2014

(65) Prior Publication Data

US 2015/0045046 A1    Feb. 12, 2015

Related U.S. Application Data

(63) Continuation of application No. 13/344,793, filed on Jan. 6, 2012, now Pat. No. 8,885,624, which is a continuation of application No. 11/966,632, filed on Dec. 28, 2007, now Pat. No. 8,121,100.

(30) Foreign Application Priority Data

Aug. 10, 2007    (GB) .................................. 0715560.9

(51) Int. Cl.
*H04W 28/16*    (2009.01)
*H04W 28/26*    (2009.01)
(Continued)

(52) U.S. Cl.
CPC .......... *H04W 72/0426* (2013.01); *H04W 16/14* (2013.01); *H04W 72/0453* (2013.01); *H04W 28/04* (2013.01); *H04W 28/16* (2013.01); *H04W 84/045* (2013.01); *H04W 88/08* (2013.01)

(58) Field of Classification Search
CPC .......... H04W 52/244; H04W 72/0426; H04W 16/00; H04W 72/04; H04W 72/0406; H04W 16/14; H04W 28/16; H04W 84/045
USPC ......... 370/280, 281, 294, 295, 328, 329, 338, 370/343, 432, 436, 480; 455/422.1, 451, 455/454, 444, 499, 452.1, 452.2, 436, 447, 455/509
See application file for complete search history.

(56) References Cited

U.S. PATENT DOCUMENTS

| | | | |
|---|---|---|---|
| 5,960,352 | A | 9/1999 | Cherpantier |
| 6,405,048 | B1 | 6/2002 | Haartsen |

(Continued)

OTHER PUBLICATIONS

"Final Office Action", U.S. Appl. No. 11/966,632, Jun. 15, 2011, 5 Pages.

(Continued)

*Primary Examiner* — Ahmed Elallam
(74) *Attorney, Agent, or Firm* — Brandon Roper; Judy Yee; Micky Minhas (57) ABSTRACT

Various embodiments relate to cellular wireless networks, including networks made up of different types of base stations. Femtocell base stations typically operate at low transmit power and provide a limited area of wireless coverage. At times, femtocells are deployed within a coverage area of a macrocell and occupy some of the same frequency spectrum and timeslots as the macrocell. At times, transmissions from the femtocell may appear as interference to a user equipment terminal, further preventing it from accessing the macrocell. In some embodiments, a cellular wireless network allocates radio resource(s) to femtocells so that the transmissions from femtocells do not occupy the same radio resource blocks as those used by the macrocell for signalling; thereby preventing interference associated with signalling to cause a connection to be lost, or prevent a connection being set up.

20 Claims, 9 Drawing Sheets

(51) Int. Cl.
*H04W 72/04* (2009.01)
*H04W 16/14* (2009.01)
H04W 28/04 (2009.01)
H04W 84/04 (2009.01)
H04W 88/08 (2009.01)

(56) References Cited

U.S. PATENT DOCUMENTS

| | | |
|---|---|---|
| 7,613,444 B2 | 11/2009 | Lindqvist et al. |
| 7,941,144 B2 | 5/2011 | Nylander et al. |
| 8,005,076 B2 | 8/2011 | Gallagher et al. |
| 8,121,100 B2 | 2/2012 | Robson et al. |
| 8,526,379 B2 | 9/2013 | Harvey et al. |
| 8,885,624 B2 * | 11/2014 | Robson et al. ............... 370/338 |
| 2004/0005897 A1 | 1/2004 | Tomoe et al. |
| 2005/0037763 A1 | 2/2005 | Hamamoto et al. |
| 2006/0073833 A1 | 4/2006 | Hamalainen et al. |
| 2007/0097938 A1 | 5/2007 | Nylander et al. |
| 2007/0183427 A1 * | 8/2007 | Nylander et al. .......... 370/395.2 |
| 2008/0085720 A1 | 4/2008 | Hirano et al. |
| 2008/0130593 A1 | 6/2008 | Scheinert et al. |
| 2008/0188265 A1 | 8/2008 | Carter et al. |
| 2010/0062768 A1 | 3/2010 | Lindqvist et al. |
| 2010/0136989 A1 | 6/2010 | Westerberg et al. |
| 2013/0337820 A1 | 12/2013 | Robson |

OTHER PUBLICATIONS

"Non-Final Office Action", U.S. Appl. No. 11/966,632, Dec. 29, 2010, 7 Pages.

"Non-Final Office Action", U.S. Appl. No. 13/344,793, Dec. 9, 2013, 9 pages.

"Notice of Allowance", U.S. Appl. No. 11/966,632, Oct. 5, 2011, 8 Pages.

"Notice of Allowance", U.S. Appl. No. 13/344,793, Jul. 10, 2014, 7 pages.

* cited by examiner

RADIO RESOURCE ALLOCATION FOR CELLULAR WIRELESS NETWORKS

RELATED APPLICATIONS

This application is a continuation of and claims priority to U.S. patent application Ser. No. 13/344,793, filed on Jan. 6, 2012, which is a continuation of issued U.S. patent application Ser. No. 11/966,632 filed Dec. 28, 2007. U.S. patent application Ser. No. 11/966,632 claims priority under 35 USC §119 or §365 to Great Britain Patent Application No. 0715560.9 filed Aug. 10, 2007, the disclosures of which are incorporate in their entirety.

BACKGROUND

The concept of the home deployed base station, or femtocell, is considered of increasing importance for cellular network operators. Femtocells operate at low downlink transmit power, and are designed to improve the cellular coverage within a home or enterprise environment and their immediate surroundings. Typically a femtocell would be linked into the wider cellular Radio Access Network through a customer's broadband link (e.g. digital subscriber line, cable, passive optical network or other wireline access technology), and provide user equipment terminals with access to data.

The term "base station" is used here to refer to a radio transceiver connected to a telecommunications network; a cell site may have several base stations, each serving a different area of wireless coverage. This deployment of multiple base stations at a cell site is particularly common for macro-cellular networks, whereas typically femtocell base stations are intended to be deployed individually, and accordingly are equipped with an omni-directional antenna. The user equipment terminal, often a mobile device such as a smart phone, Personal Digital Assistant (PDA) or laptop and the like, is alternatively referred to as a "user equipment".

The use of femtocells is particularly applicable in high capacity packet data cellular wireless communication systems such as HSPA ('High Speed Packet Access'), a so-called third generation evolutionary system, and LTE (Long Term Evolution), often referred to as a fourth generation (4G) system. Services using such systems can typically accommodate a variable data rate to and from the user equipment, and can exploit a greater data rate should it be available, for example for the faster transfer of data files. It is accordingly advantageous to maximise the data capacity available to a user, and to this end adaptive modulation and coding is typically employed. The provision of a femtocell within a subscriber's premises can provide a high capacity link within a small local area that will typically also be within the coverage area of a macrocell.

Although generally placed indoors, femtocells operate within an existing conventional cellular wireless network, which is termed a macrocellular network. There may typically be hundreds of femtocells for every macrocell. The large number of femtocells may interfere with the signal from the macrocells, particularly in the downlink direction from the macrocell base station to the user equipment, in some cases preventing access altogether. This problem is accentuated in the case of "closed access" femtocells which can only be used by a limited group of user equipments. User equipments outside the closed access group may receive a strong signal from the femtocell, however as they cannot use it, it acts as interference to signals received from macrocells.

Figure 1:
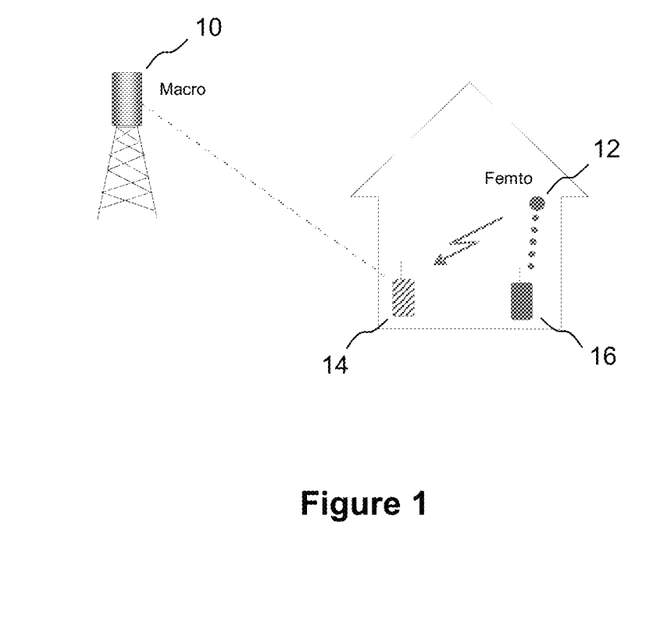
FIG. 1 is a schematic diagram illustrating potential interference from a femtocell base station received at a user equipment communicating with a macrocell base station.

FIG. 1 illustrates the problem of interference in the closed access case. A femtocell base station 12 is in communication with a user equipment 16. Nearby, a second user equipment 14 receives a strong signal from the femtocell 12 but cannot establish a connection with the femtocell, as the femtocell is closed to access by the second user equipment 14. As mentioned above, the signal from the femtocell base station 12 conventionally occupies the same frequency band as is occupied by the macrocell base station 10, so that the signal from the femtocell base station 12 potentially acts as interference with signals received from macrocell base station 10 at a second user equipment 14.

A second problem relating to the provision of a large number of femtocells within the coverage area of a macrocell base station is the expenditure of power by a user equipment when performing measurements for handover decisions: it can be expected that there is a larger number of near neighbours than are present in a conventional macrocell system, and this will trigger a commensurately larger number of handover-related actions on the part of the user equipment than is experienced in macrocell systems. These actions involve processing on the part of the user equipment, which is particularly undesirable given that the battery life of a user equipment, typically a handset, should be maximised.

One known solution to these problems is for femtocells to use a different frequency channel to that used by a macrocell deployed in the same area. Whilst this avoids interference problems, it is undesirable to operators, since spectrum is expensive to acquire.

Another known alternative is to use an interference mitigation technique: femtocells base stations detect the level of interference they are causing to the user equipments served by a macrocell base station operating in the same area, and reduce their power accordingly. However, this will potentially limit the coverage area and data rate available to users of the femtocell.

At least some embodiments provide a method and apparatus which addresses these disadvantages.

SUMMARY

In accordance with one or more embodiments, there is provided a method of allocating radio resources in a radio communications network, the radio communications network comprising a first base station open for access to substantially any user equipment terminal of the radio communications network and a second base station open for access to only a predetermined one or more user equipment terminals of the radio communications network, wherein the first base station is arranged to use a first plurality of radio resource blocks for radio communications with user equipment terminals, and the first plurality includes one or more radio resource blocks useable by the first base station for signalling, the method comprising: allocating a second plurality of radio resource blocks for use by the second base station in radio communications with user equipment terminals, wherein the first plurality and the second plurality of radio resource blocks have at least one radio resource block in common, and wherein the second plurality of radio resource blocks does not include said one or more radio resource blocks useable by the first base station for signalling.

In embodiments, a first base station, such as a macrocell base station, is open to access to substantially any user and may operate in all or part of the frequency band used by a second base station, such as a femtocell, this being open for access to only a predetermined one or more user equipment terminals. A user equipment terminal that is denied access to the femtocell base station may be located in close proximity thereto, so that it may receive a stronger signal from the femtocell base station than from the macrocell base station. The signal from the femtocell base station therefore has potential to cause interference at the user equipment terminal, potentially preventing it from communicating with the macrocell base station if interference is experienced with radio resource blocks that are used by the macrocell base station for signalling. Since the femtocell base station is allocated radio resource blocks other than those used for signalling by the macrocell base station, the user equipment terminal can advantageously maintain communication with the macrocell base station.

Radio resource blocks represent allocations of parts of the frequency spectrum within specified timeslots. In some cases, the radio resource blocks allocated to the femtocell and macrocell base stations are separated in frequency, with the benefit that transmission at the femtocell and macrocell base stations can be simultaneous, thus simplifying the design as some timing constraints are removed.

Conveniently, the radio resource blocks allocated to the macrocell base station occupy a contiguous frequency range, with the benefit that the available data capacity within a receiver bandwidth is maximised. Similarly, it is beneficial for the radio resource blocks allocated to the macrocell base station to occupy a contiguous frequency range.

Advantageously, the radio resource blocks allocated to the femtocell base station are a subset of the radio resource blocks allocated to the macrocell base station, with the benefit that no additional frequency spectrum is required for the operation of the femtocell base station beyond that allocated for the operation of the macrocell base station.

In a further arrangement the radio communications network includes a further base station, for example of the femtocell type, and thus one which is accessible by only a predetermined one or more user equipment terminals. At times, radio resource blocks allocated to this further femtocell are not used by either the first femtocell or macrocell for signalling so that interference with signalling by each of the base stations is prevented.

Further features and advantages will become apparent from the following description of various embodiments, given by way of example only, which is made with reference to the accompanying drawings.

DETAILED DESCRIPTION

At least one embodiment will be described in the context of a cellular wireless communication network comprising macrocell and femtocell base stations, with particular reference to the frequency division duplexed systems. However, it will be understood that this example is for illustration purposes, and techniques described can be applied to radio communications generally and to systems complying with other wireless standards. For example, some embodiments are applicable to radio access systems generally and, in some cases, to time division duplex systems in addition to frequency division duplexed systems.

Figure 2:
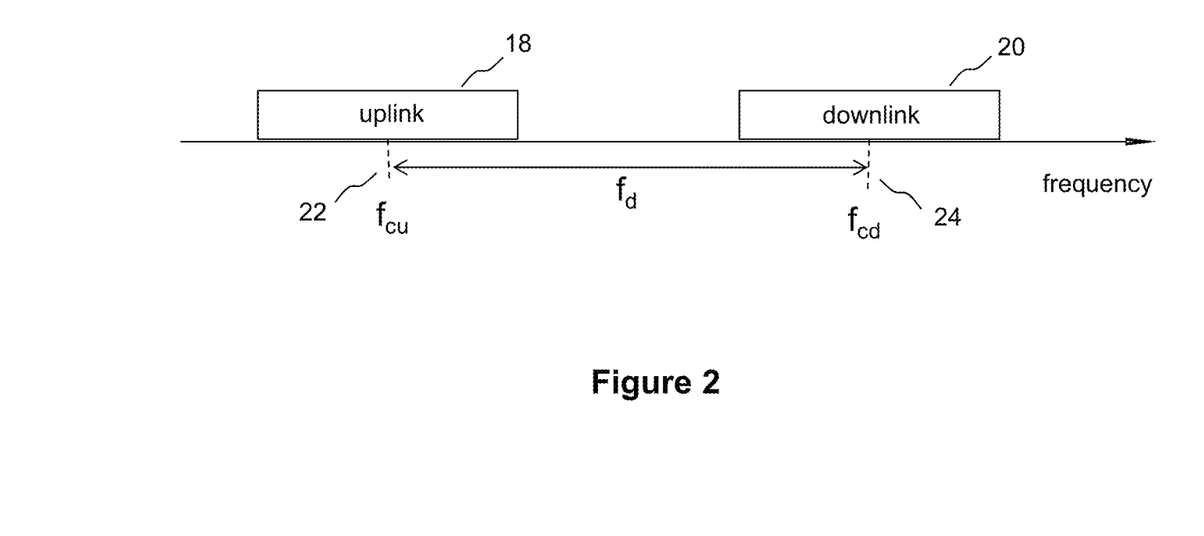
FIG. 2 is a schematic diagram showing a conventional frequency division duplex frequency plan.

FIG. 2 illustrates the frequency plan for a conventional frequency division duplex radio communication system, such as the Third Generation Partnership Project Long Term Evolution System, know as LTE. It can be seen that a block of frequencies 18 with a centre frequency $f_{cu}$ 22 is allocated for use in the uplink, that is the path from a user equipment to a base station, and that a further block of frequencies 20 with a centre frequency $f_{cu}$ 24 is allocated for use in the downlink, that is the path from a base station a user equipment. The centre frequencies of the uplink and downlink blocks are separated by a frequency difference $f_d$.

Figure 3A:
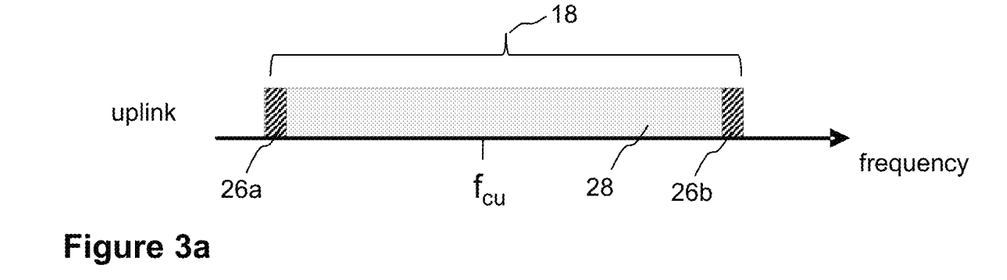
FIG. 3a is a schematic diagram showing a conventional frequency allocation for an uplink showing critical portions.

FIG. 3a illustrates the conventional resource allocation within the uplink frequency band. Certain frequency blocks are allocated for the communication of signalling information; these blocks 26a and 26b are shown as shaded portions. The remainder of the band 28 is allocated for the communication of payload data. The position of the frequency blocks allocated to signalling in the uplink and the downlink are shown is an example only; the position within the band may differ. Also, it should be noted that data may be carried in addition in the frequency blocks allocated for signalling in both the uplink and the downlink.

Figure 3B:
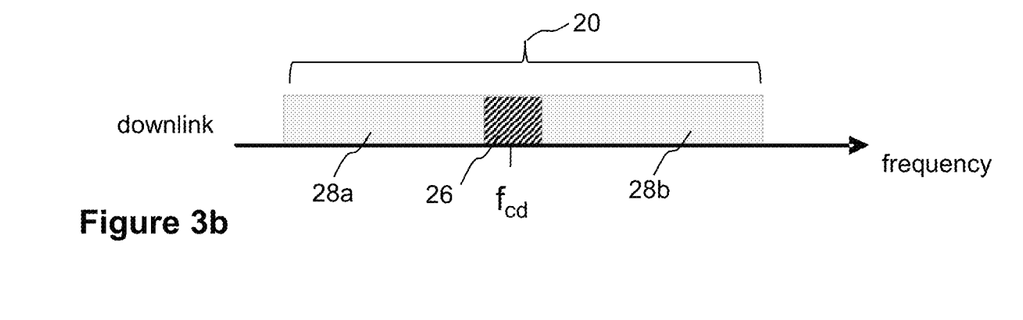
FIG. 3b is a schematic diagram showing a conventional frequency allocation for a downlink showing critical portions.

FIG. 3b illustrates the conventional resource allocation within the downlink frequency band. Frequency block 26 is allocated for the communication of signalling information and the remainder of the band 28a, 28b is allocated for the communication of payload data. Note that in this example, the frequency blocks allocated in the uplink and downlink for signalling occupy different parts of the spectrum, relative to the centre frequency.

Figure 3C:
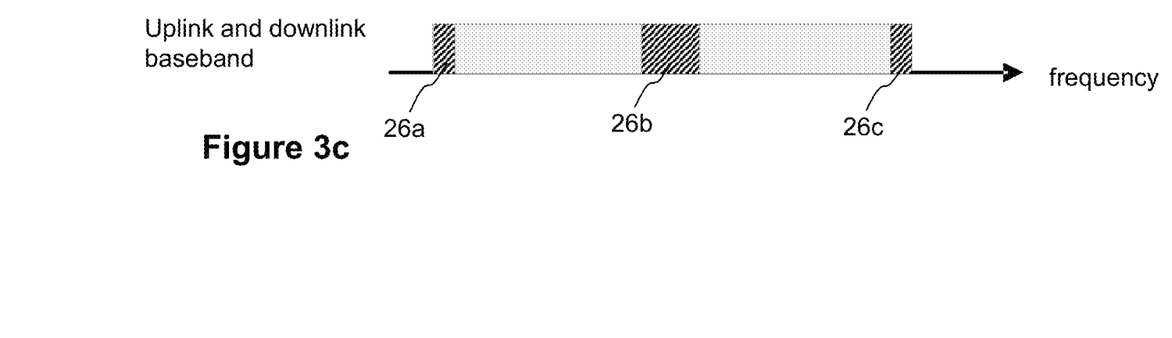
FIG. 3c is a schematic diagram showing a conventional frequency allocation for an uplink and downlink at baseband showing critical portions.

FIG. 3c shows the uplink and downlink frequency allocations overlaid for comparison; in this case the frequency allocations are referred to baseband, that is to say the centre frequency is translated to zero. It can be seen that the parts 26a, 26b and 26c of the spectrum allocated to signalling on either the uplink or the downlink occupy regions at either end and the centre of the spectrum.

Figure 4:
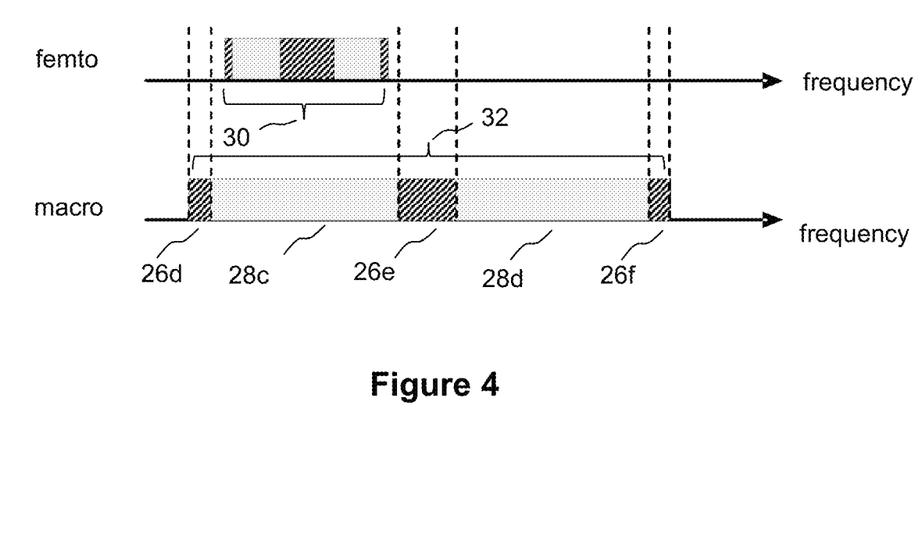
FIG. 4 is a schematic diagram showing a frequency allocation for a femtocell relative to the frequency allocation to a macrocell according to at least one embodiment.

FIG. 4 illustrates a frequency arrangement according to at least one embodiment. It can be seen that a frequency band 30 is allocated for use by a femtocell and that this band 30 does not overlap the regions 26d, 26e and 26f used for signalling in the macrocell spectrum 32. The frequency allocation to the femtocell can be a contiguous region, as shown in FIG. 4; whilst this is beneficial in terms of reducing the requirements on receiver bandwidth at the femtocell, the allocation could be distributed in any manner across the spectrum 32, provide that there is no overlap between the frequency band 30 utilised by the femtocell and signalling frequencies 26d, 26e, 26f. The frequency allocation illustrated in FIG. 4 shows the uplink and downlink bands overlaid at baseband; the translation to radio frequency will be performed in such a way that the relationship between femtocell and macrocell bands is maintained as illustrated.

The factors determining frequency allocation according at least one embodiment will now be described. In general, interference with data messages can generally be tolerated because transmissions can occur despite the interference, whereas interference with signalling messages may result in a dropped connection or the inability to establish a connection to a base station at all. Some embodiments can be configured to avoid interference with signalling messages when designing frequency allocation schemes.

As stated above, interference with data messages can be tolerated because mitigation techniques such as error correction coding, or resending of corrupted data, can be employed to ensure that the message is successfully received. In addition, provided parts of the band do not contain interference, these can be used to transport data. There is also an efficient technique available known as hybrid ARQ (automatic resend request) that can mitigate the effects of corruption of data. In many cases, a reduced data rate may be tolerated by a user, or additional timeslots may be allocated to the user to compensate for the poorer received signal quality. Furthermore, retransmissions of the data to the user equipment may be scheduled so as to select a portion of the spectrum unaffected by the interference due to the femtocell.

Turning now to signalling messages, such messages may comprise broadcast messages allocating radio resource and enabling synchronisation, as is known in the art. These messages are typically transmitted on the downlink and affect operation of the links in both directions. Furthermore the messages cannot generally be reallocated to other parts of the band in the event that received signals experience interference. It is thus beneficial to position the femtocell frequency allocation in parts of the band that do not correspond with the signalling frequencies of the macrocell downlink, to avoid interference from nearby femtocells. The frequency allocation to the femtocell also optionally avoids the portions of the uplink frequency allocation that contain signalling information.

Figure 5:
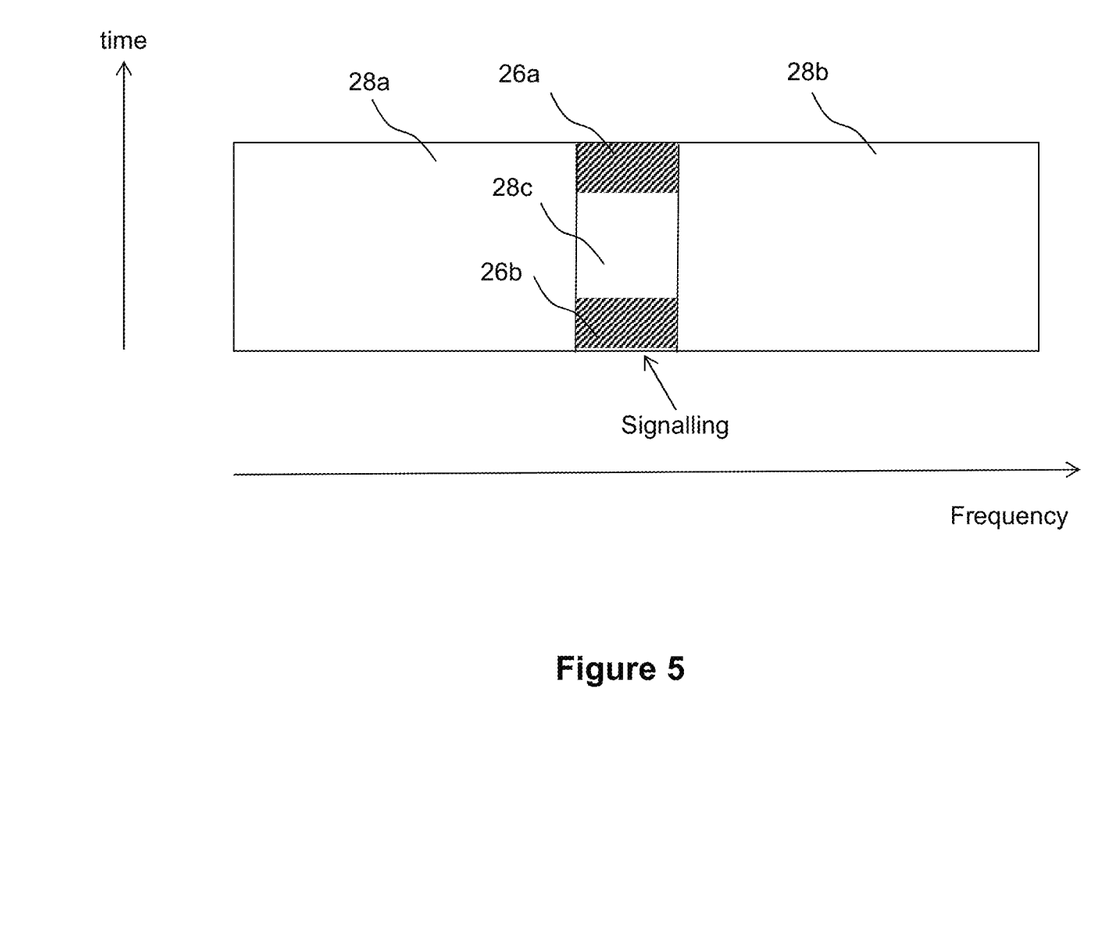
FIG. 5 is a schematic diagram showing a first example of a radio resource block allocation according to at least one embodiment.

FIG. 5 illustrates the radio resource allocation in the downlink in terms of both frequency and time. It can be seen that in the frequency band allocated for signalling, only the radio resource blocks indicated by the reference numerals 26a, 26b are actually allocated to signalling, and that this signalling region is shared by at least one block 28c for the carriage of data. As a result it can be seen that only certain timeslots of the frequency spectrum nominally allocated to signalling are used for signalling. This arrangement represents a more complex allocation of radio resources than is associated with conventional arrangements, since resources are allocated in time in addition to being allocated in frequency. As a result femtocells can occupy radio resource blocks that are not used by the macrocell for frequency. Analogous regions in the radio resource blocks that are allocated to the uplink can also be allocated to a femtocell while avoiding the parts of the radio resource used by the macrocell for signalling.

Figure 6:
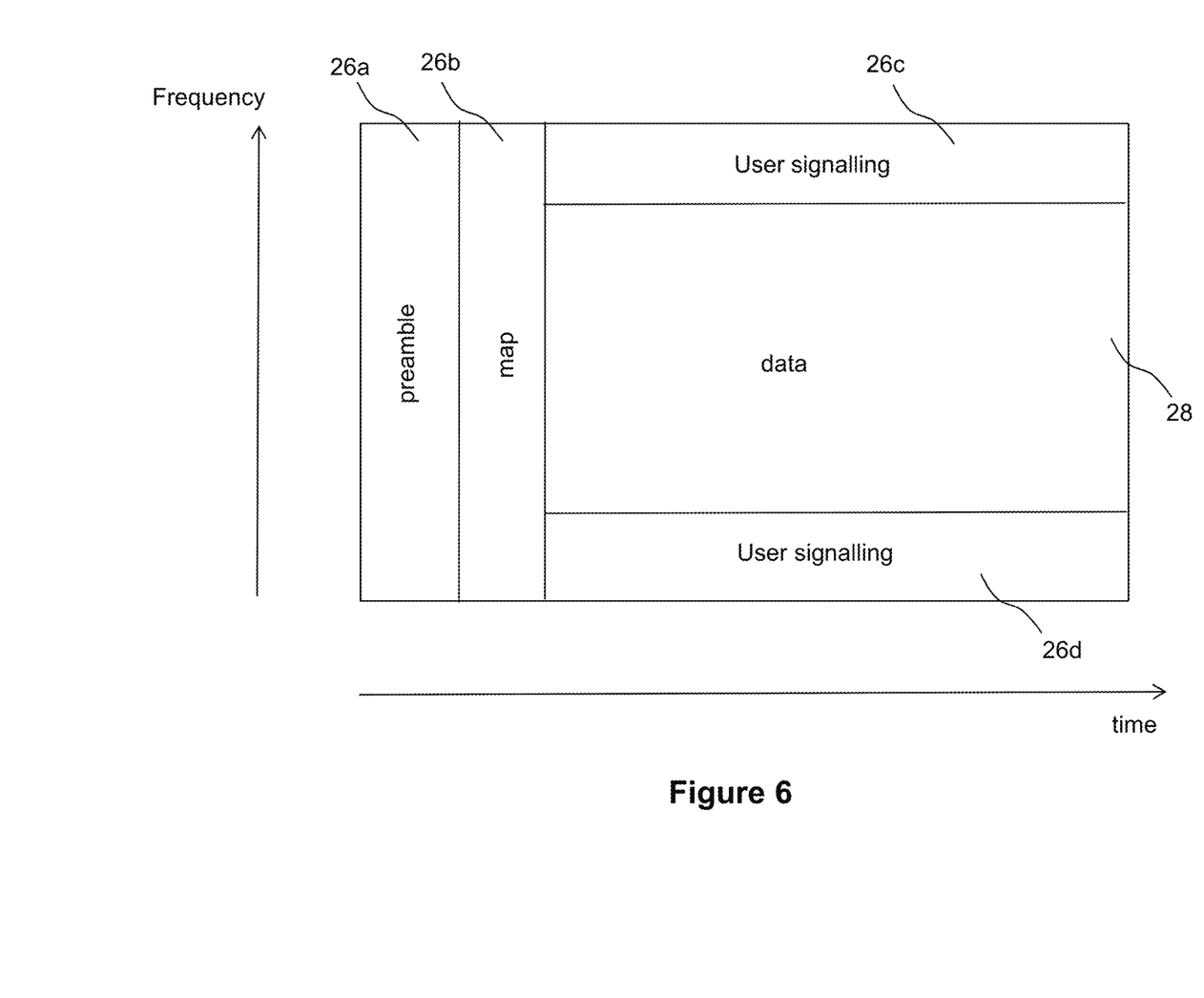
FIG. 6 is a schematic diagram showing a second example of a radio resource block allocation according to at least one embodiment.
Figure 7:
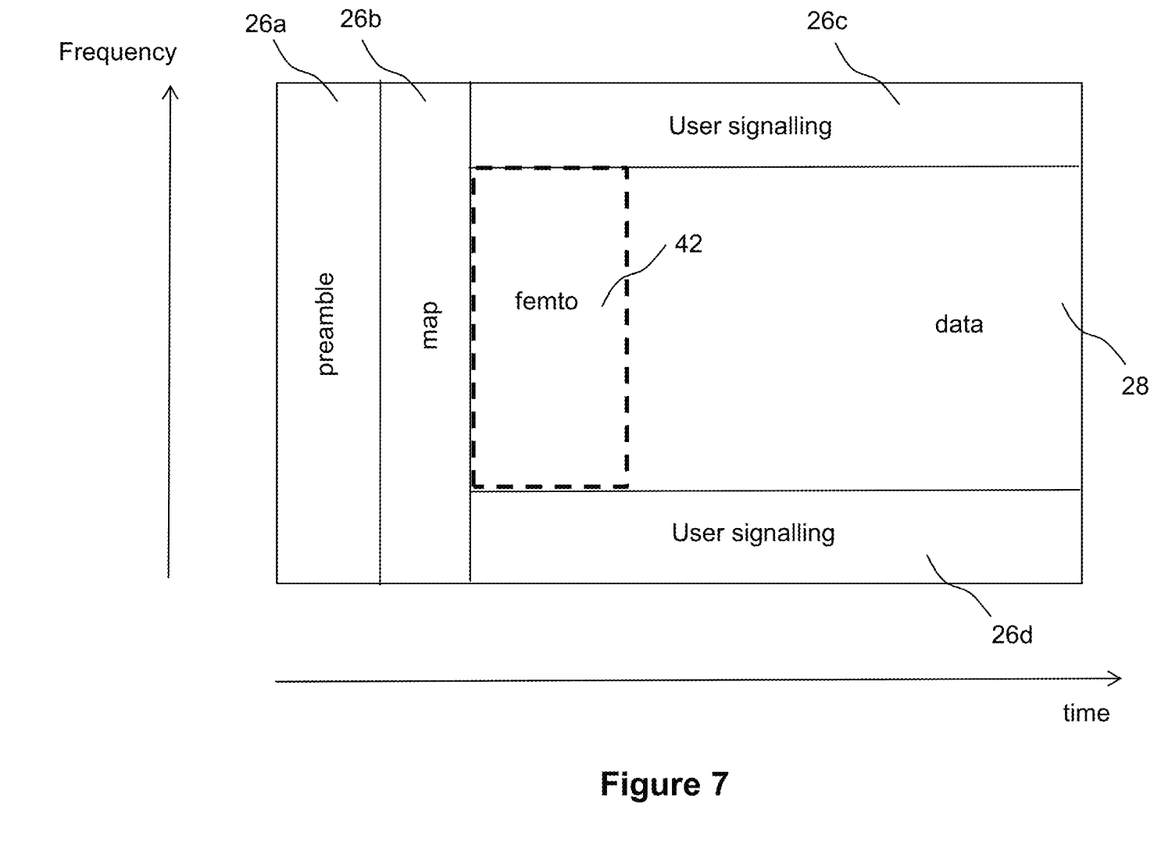
FIG. 7 is a schematic diagram showing radio resource block allocation to a macrocell and a femtocell according to at least one embodiment.

FIG. 6 shows an alternative allocation of macrocell radio resource blocks to that shown in FIG. 5; the regions shown are illustrative only and the position may vary between implementations. It can be seen that regions 26a, 26b, 26c, 26d carrying signalling occupy potentially all of the frequency allocation at some point in time, meaning that an implementation in which interference with signalling is avoided by frequency allocation alone is thus not feasible, and as a result an allocation of radio resource blocks to femtocells in both frequency and time is required. Turning to FIG. 7, such an allocated region is indicated by part 42. An allocation such as this may be particularly applicable to some implementations of the IEE802.16 WiMax systems.

Figure 8:
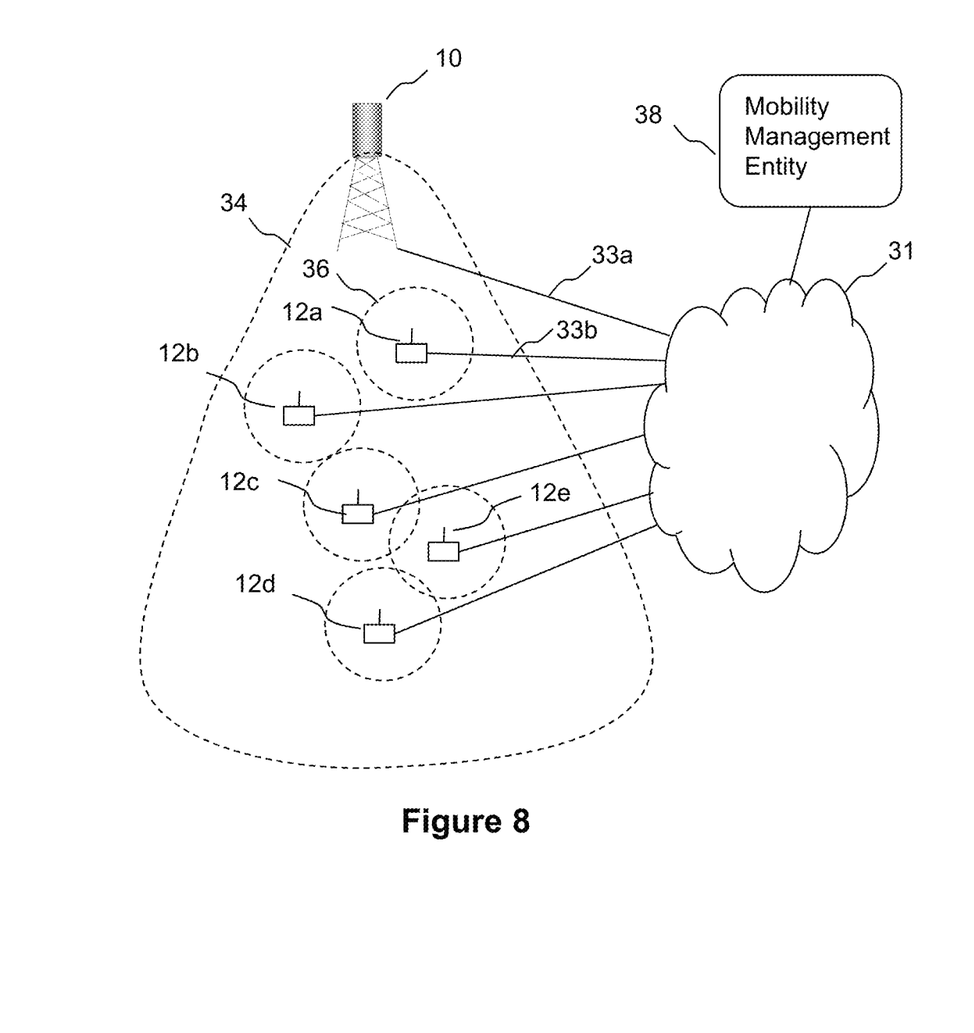
FIG. 8 is a schematic diagram showing the coverage area of a macrocell and five femtocells configured according to at least one embodiment.

FIG. 8 shows a situation in which many femtocells 12a . . . 12e are deployed in the area of wireless cellular coverage 34 of a macrocell base station 10. The areas of wireless cellular coverage 36 of one of the femtocells 12a is shown, and equivalent areas of wireless cellular coverage are shown for the other femtocells in the illustration. It can be seen that there is potential for interference between femtocells, especially in the case of femtocells indicated by reference numerals 12c, 12d and 12e.

The femtocells 12a . . . 12e and macrocell 10 are in potential communication through the backhaul links 33a . . . 33e to a telecommunications network 31 and to a mobility management entity 38. The mobility management entity 38 may in an example of an implementation manage the radio resource allocation to the femtocells as described in this embodiment. This may involve allocating femtocells different radio resource blocks from those allocated to their neighbours to reduce the probability of interference between femtocells.

Figure 9:
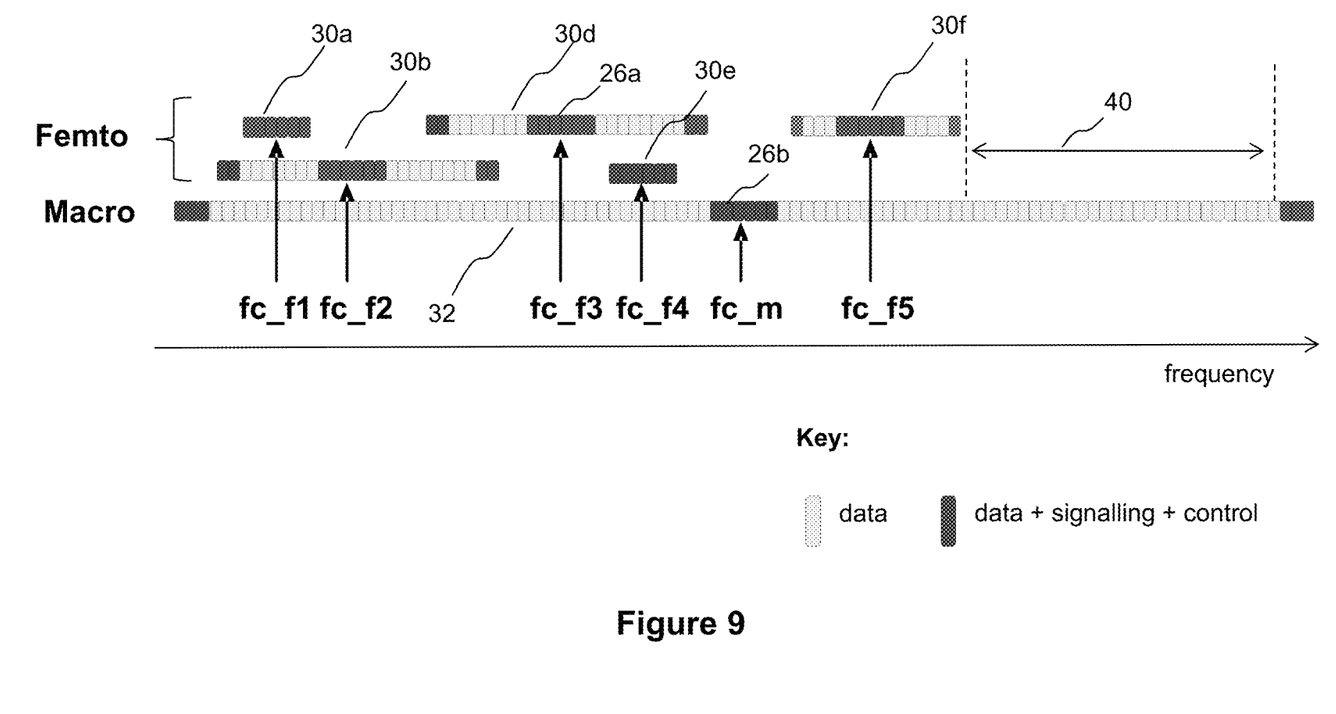
FIG. 9 is a schematic diagram showing a frequency allocation to a macrocell and five femtocells configured according to at least one embodiment.

FIG. 9 illustrates an example of an allocation of frequency bands 30a . . . 30f to multiple femtocells 12a . . . 12f operating in the area of wireless coverage of a macrocell 10 occupying a frequency band indicated by the reference numeral 32. In at least one embodiment, a frequency allocation is made to femtocells that does not overlap between femtocells. If this is not possible, then at least the parts of the femtocell allocations used for signalling should not overlap with the equivalent parts allocated to other adjacent femtocells.

In some cases, at least part 40 of the portion of the macrocell frequency spectrum that is allocated to payload data is protected from also being allocated to femtocells, so that the macrocell retains a reasonable data capacity when experiencing interference from femtocells.

It can be seen that the centre frequencies fc_f1, fc_f2, fc_f3, fc_f4, fc_f5 allocated to femtocells differ between respective femtocells. Since the algorithms controlling handover operate in such a way that handover of a user equipment between base stations with different centre frequencies are controlled by default by the network controller rather than locally at the user equipment, this has the advantage of enabling such handover operations to be inhibited if necessary by a network controller. As a result the network controller can prevent a user equipment terminal making unnecessarily frequent handover measurements that would otherwise consume power and reduce battery life.

The above embodiments are to be understood as illustrative examples. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the claimed subject matter.

The invention claimed is:

1. A node of a radio communication network, the node implemented, at least in part, in hardware and configured to:

allocate a set of radio resources for use by an open access base station in the radio communication network, the open access base station in radio communication with one or more user equipments, the set of radio resources allocated for use by the open access base station comprising a sub-set of radio resources allocated for signaling between the open access base station and the one or more user equipments; and allocate a respective set of radio resources for use by each restricted access base station of one or more restricted access base stations in the radio communication network, each restricted access base station of one or more restricted access base stations in radio communication with its respective predetermined set of user equipments, each respective set of radio resources including at least one radio resource allocated for use by the open access base station, but not including radio resources of the subset of radio resources allocated for signaling between the open access base station and the one or more user equipments, wherein:

the respective sets of radio resources allocated for each restricted access base station of one or more restricted access base stations comprises respective radio resources allocated for use by each respective restricted access base station for signaling between the respective restricted access base station and its respective predetermined set of user equipments;

at least some radio resources are allocated to more than one of the respective sets of radio resources allocated for use by respective restricted access base stations of one or more restricted access base stations;

none of the radio resources allocated to more than one of the respective sets of radio resources allocated for use by respective restricted access base stations are radio resources allocated for use by restricted access base stations for signaling; and the sets of radio resources comprise at least one of:
sets of frequencies; or
sets of radio resources in a time-frequency space.

2. The node of claim 1, wherein:
the radio communication network comprises plural restricted access base stations; and
the respective sets of radio resources allocated for each restricted access base station are distinct.

3. The node of claim 1, wherein the sets of frequencies are contiguous frequency ranges.

4. The node of claim 1, wherein the radio communication network comprises a Long Term Evolution (LTE) radio communication network.

5. The node of claim 1, wherein the node is further configured to allocate the set of radio resources for use by the open access base station based, at least in part, on protecting a portion of radio frequencies that are used by the open access base station for payload data from being allocated to the one or more restricted access base stations.

6. The node of claim 1, wherein the set of radio resources for use by the open access base station comprises one or more downlink resources.

7. The node of claim 1, wherein at least one restricted access base station of the one or more restricted base stations comprises a femtocell base station.

8. A method implemented, at least in part, using a computer and comprising:

allocating a set of radio resources for use by an open access base station in a radio communication network, the open access base station in radio communication with one or more user equipments, the set of radio resources allocated for use by the open access base station comprising a sub-set of radio resources allocated for signaling between the open access base station and the one or more user equipments; and allocating a respective set of radio resources for use by each restricted access base station of one or more restricted access base stations in the radio communication network, each restricted access base station of one or more restricted access base stations in radio communication with its respective predetermined set of user equipments, each respective set of radio resources including at least one radio resource allocated for use by the open access base station, but not including radio resources of the subset of radio resources allocated for signaling between the open access base station and the one or more user equipments, wherein:

the respective sets of radio resources allocated for each restricted access base station of one or more restricted access base stations comprises respective radio resources allocated for use by each respective restricted access base station for signaling between the respective restricted access base station and its respective predetermined set of user equipments;

at least some radio resources are allocated to more than one of the respective sets of radio resources allocated for use by respective restricted access base stations of one or more restricted access base stations;

none of the radio resources allocated to more than one of the respective sets of radio resources allocated for use by respective restricted access base stations are radio resources allocated for use by restricted access base stations for signaling; and the sets of radio resources comprise at least one of:
sets of frequencies; or
sets of radio resources in a time-frequency space.

9. The method of claim 8, wherein:
the radio communication network comprises plural restricted access base stations; and
the respective sets of radio resources allocated for each restricted access base station are distinct.

10. The method of claim 8, wherein the sets of frequencies are contiguous frequency ranges.

11. The method of claim 8, wherein the radio communication network comprises a Long Term Evolution (LTE) radio communication network.

12. The method of claim 8, wherein the allocating the set of radio resources for use by the open access base station is based, at least in part, on protecting a portion of radio frequencies that are used by the open access base station for payload data from being allocated to the one or more restricted access base stations.

13. The method of claim 8, wherein the set of radio resources for use by the open access base station comprises one or more downlink resources.

14. The method of claim 8, wherein at least one restricted access base station of the one or more restricted base stations comprises a femtocell base station.

15. A restricted access base station implemented, at least in part, in hardware and configured to operate in a radio communication network, the restricted access base station being configured to:

enable access to the restricted access base station to a respective predetermined set of user equipments in a respective serving area of the restricted access base station, the serving area of the restricted access base station being at least partially within a serving area associated with an open access base station in a same radio communication network as the restricted access base station, the open access base station being open for access by any user equipment supported by the radio communication network in the serving area associated with open access base station, the open access base station being allocated a set of radio resources for use in radio communication with the user equipments in the serving area associated with the open access base station, the set of radio resources allocated for use by the open access base station comprising a sub-set of radio resources allocated for signaling between the open access base station and the user equipments in the serving area associated with the open access base station; and allocate a respective set of radio resources for use by the restricted access base station in radio communication with the respective predetermined set of user equipments, each respective set of radio resources including radio resources allocated for use by the open access base station, but not including radio resources of the sub-set of radio resources allocated for signaling between the open access base station and user equipments, wherein the radio communication network comprises at least one further restricted access base station, each further restricted access base station being open for access by a respective predetermined set of user equipments and being allocated a respective set of radio resources for use in radio communication with its respective set of user equipments, wherein the respective sets of radio resources allocated for each further restricted access base station comprise respective radio resources allocated for use by each further restricted access base station for signaling between the further restricted access base station and its respective predetermined set of user equipments, wherein the restricted access base station further configured to allocate a respective set of radio resources for use in radio communication with its respective predetermined set of user equipments which does include radio resources allocated for use by at least one further restricted access base station, wherein none of the radio resources allocated to more than one of the respective sets of radio resources allocated for use by respective restricted access base stations are radio resources allocated for use by restricted access base stations for signaling, and wherein the sets of radio resources are at least one of:

sets of frequencies, or sets of radio resources in a time-frequency space.

16. The restricted access base station of claim 15, wherein the sets of frequencies are contiguous frequency ranges.

17. The restricted access base station of claim 15, wherein the radio communication network comprises a Long Term Evolution (LTE) radio communication network.

18. The restricted access base station of claim 15, wherein the set of radio resources allocated for use by the restricted access base station is based, at least in part, on preventing a portion of radio frequencies that are used by the open access base station for payload data from being allocated to the restricted access base station.

19. The restricted access base station of claim 15, wherein the set of radio resources for allocated for use by the restricted access base station comprises one or more downlink resources.

20. The restricted access base station of claim 15, wherein the restricted access base station comprises a femtocell base station.

* * * * *